United States Patent Office 3,321,309

Patented May 23, 1967

3,321,309

PROCESS FOR THE PRODUCTION OF PRINTING PLATES

Maximilian Karl Reichel, Wiesbaden-Biebrich, Germany, assignor, by mesne assignments, to Azoplate Corporation, Murray Hill, N.J.

No Drawing. Filed Oct. 23, 1964, Ser. No. 406,163
Claims priority, application Germany, Oct. 26, 1963, K 51,191
9 Claims. (Cl. 96—36)

In U.S. Patent No. 3,143,417, there is described a light-sensitive material for use in screen printing comprising a porous support having thereon a light-sensitive coating containing an N-alkoxymethylated poly-$\epsilon$-caprolactam, which may be partially depolymerized and is soluble at room temperature in aliphatic alcohols or in aqueous aliphatic alcohols, and a light-sensitizer which is an azido compound of the formula

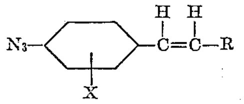

in which R is an aliphatic, aromatic or heterocyclic group and X is hydrogen, an —$SO_3H$ or —COOH group which can form a water-soluble alkali salt, or a sulfonamide group of the formula —$SO_2NH$—aryl, in which the aryl group may be substituted.

In U.S. Patent No. 3,143,416, there is described a similar light-sensitive material for the same intended use in which the caprolactam is replaced by an N-alkoxymethylated, partially depolymerized polycondensate of an $\omega$-$\omega'$-diamine with an $\omega$-$\omega'$-dicarboxylic acid, which condensate is soluble at room temperature in aliphatic alcohols or in aqueous aliphatic alcohols.

When such light-sensitive material is exposed image-wise to light, the lactam or the polycondensate, as the case may be, becomes hardened or tanned in the exposed areas, and is thereby rendered insoluble in alcohol, so that the exposed areas of the coating remain adherent to the support and the unexposed areas are removed when the exposed material is subjected to development by treating it with aqueous alcohol.

If, however, it is sought to apply the aforementioned coating materials to a metal support, which requires etching after development, e.g. with an aqueous solution of a metal chloride or a metal nitrate, which may in some cases contain a small amount of free acid, a difficulty arises because the portions of the coating which remain adherent to the support after development have been insufficiently hardened, by the exposure to light, to render them resistant to the etching solution.

According to the present invention, this difficulty is obviated by subjecting the coating, after exposure and development and prior to etching, to treatment with a dilute aqueous solution of a non-oxidizing acid (or of a salt which liberates such an acid by hydrolysis) which is effective to further harden the remaining parts of the coating to an extent sufficient to render them inert to the etching solution. This acid treatment achieves further hardening of the coating as the result of cross-linking, so that the coating remains stable when subsequently treated with the acid-reacting etching solution.

The following are preferred examples of the hardenable constituent of the coating: partially N-alkoxymethylated poly-$\epsilon$-caprolactams having K-values between 63 and 69 and $\eta$-values between 0.5 and 1.0, partially depolymerized, partially N-alkoxymethylated $\epsilon$-caprolactams having K-values between 30 and 35 and $\eta$-values between 0.15 and 0.21, partially depolymerized and partially N-alkoxymethylated polycondensates of an $\omega,\omega$-diamine and an $\omega,\omega'$-dicarboxylic acid having K-values between 30 and 60 and $\eta$-values between 0.43 and 0.62. By K-value is meant the value according to Fikentscher (see W. Schäfer, Einführung in das Kunstoffgebiet, Akademische Verlagsgesellschaft Leipzig (1951), page 104). It is dependent on the intrinsic viscosity and corresponds approximately to the equation $\eta=2.3\cdot(75.10^{-6}K^2+10^{-3}K)$. The symbol $\eta$ stands for intrinsic viscosity (cf. E. O. Kraemer, Ind. Eng. Chem. 30 (page 1200 et seq.), 1938). The alkoxymethylated products should, in the case of the $\epsilon$-caprolactam derivatives, have 20 to 35%, preferably 25 to 30%, and in the case of the polycondensates 20 to 50%, preferably 25 to 40%, of carboxylic acid amide groups in which hydrogen linked to the acid amide nitrogen is replaced by alkoxymethyl groups.

The acid used in the hardening solution preferably has a dissociation constant, measured at 25° C., of at least $1.1\times10^{-3}$; both inorganic and organic acids are suitable. In general, the effectiveness of the acids increases with an increase in the dissociation constant; hydrochloric acid and sulfuric acid are particularly effective. Other inorganic acids are also suitable, such as fluoroboric acid and the various acids of phorphorus, for example ortho- and pyrophosphoric acid, and orthophosphorous acid. Exemplary of suitable organic acids are oxalic acid, malonic acid, maleic acid, fumaric acid, tartaric acid, monochloroacetic acid, dichloroacetic acid and trichloroacetic acid.

The hardening solution may also be a solution of a salt, which when dissolved in water at room temperature or a moderately elevated temperature, for example under 40° C., decomposes entirely or partially by hydrolysis into a hydroxide or oxide and one of the aforementioned acids. Exemplary are the salts of divalent nickel, divalent copper, trivalent iron, trivalent chromium and aluminum with one of the aforementioned strong mineral acids, especially hydrochloric acid. Ferric chloride and aluminum chloride are particularly suitable and are frequently more effective than hydrochloric acid. Mixtures of the salts and acids may also be used. The solution generally contains 1 to 5 percent by weight, preferably 2 to 3 percent, of the acid or salt. When salts are used, concentrations of less than 1 percent are sufficient in many cases. Thus, for example 0.25 percent aqueous solutions of aluminum chloride, ferric chloride or chromic chloride and 0.75 percent aqueous solutions of cupric chloride effect pronounced cross-linking of the coating.

The support may be a plate or sheet of copper, aluminum, chromium, iron, magnesium or zinc.

Bimetal or trimetal supports may also be used. Thus, the support may be a bimetal plate constituted by a layer of iron, zinc or aluminum which is coppered electrolytically on one or both sides. A suitable trimetal plate is such a coppered plate having a layer of chromium deposited electrolytically upon one or both of the coppered surfaces. The support may consist of a non-metallic base, for example a transparent plastic film, carrying a thin coating of metal, such for example as a foil of polyterephthalic acid glycolester bonded to a copper foil.

The metal support is coated in a conventional manner, for example by dipping, roller application or application to the rotating support, with a solution containing the light-sensitive azido compounds and the hardenable N-alkoxymethylated polyamide. Preferably, the polyamide and the azido compound are separately dissolved and the two solutions are combined thereafter. The solvent for the polyamide is preferably a mixture of methyl or ethyl alcohol, and the azido compound can be dissolved in the same kind of mixture or in a solvent compatible therewith, e.g. a glycol ether, such as ethyleneglycol monomethylether or ethyleneglycol monoethylether. The solution may also include an additional sensitizer, a dye, a plasticizer and other suitable additives.

After drying, the printing plate is exposed under a positive or negative original to a light source which emits radiation in the near ultraviolet range of the spectrum. The unexposed areas of the coating are then removed by wiping over with an aqueous alcoholic solution, for example a 60–80 percent aqueous solution of methyl or ethyl alcohol. In order to make the resulting tanned image visible, an alcohol-soluble dye, for example methyl violet or fuchsine (cf. Schultz, Farbstoffsabellen, vol. 1, 7th edition, 1931, Nos. 783 and 780 respectively) may be included in the alcoholic solution. The image may also be rendered visible by treating the coating with a solution of a dye after the coating has been developed with aqueous alcohol.

The tanned image, preferably after drying with warm air, is now treated with the aforementioned hardening solution. The image may be moistened, for example for two minutes at room temperature or a moderately elevated temperature, for example 20–26° C., with a pad of cotton soaked with the hardening solution or it may be bathed in the hardening solution. The image may then be washed for a short time with running water and dried at 80–100° C.

While the desired cross-linking occurs practically instantly in the case of ε-caprolactam derivatives, it is desirable when the polycondensates are used to allow the hardening solution to act on the image for at least 3–4 minutes, preferably 3–5 minutes. The cross-linking can in some cases be accelerated by the use of moderately elevated temperatures, for example 50 to 70° C.

The metal surface bared as the result of the development is then etched to the desired depth with a suitable etching agent. In the case of a copper support, a 40 to 60 percent aqueous solution of ferric chloride or ferric nitrate may be used. In the case of a chromium support, a 40 to 60 percent aqueous solution of the chloride or nitrate of magnesium, calcium, strontium, barium, zinc, iron, cobalt or manganese or of ammonium may be used. In order to increase the speed of etching, the solution may include 0.1 to 3 percent (in the case of copper) or 0.1 to 8 percent (in the case of chromium) of free hydrochloric or nitric acid. Due to the preceding hardening treatment with acid, these etching solutions do not attack the portions of the coating remaining on the support.

The process of the invention is especially suitable for the production of printing plates for copper-plate printing by the intaglio process, and for the production of printed circuits.

The invention will be further illustrated by reference to the following specific examples:

*Example 1*

200 ml. of a 6 percent solution, in 80 percent ethyl alcohol or 80 percent methyl alcohol, of an N-methoxymethyl-poly-ε-caprolactam having a K-value of 63.2, an intrinsic viscosity of 0.65 and a methoxy content of 7.5–8 percent, corresponding to 38 to 40 percent of substituted carboxylic acid amide groups, are mixed with mechanical stirring, at 45 to 50° C., with a solution of 6 grams of sodium 4,4-diazidostilbene-2,2′-disulfonate in 50 ml. of 50 percent ethyleneglycol monomethylether, and made up to 300 ml. with 96 percent ethyl alcohol or methyl alcohol. A rotating copper cylinder, heated to 40–50° C., is coated with the filtered solution by means of a spray nozzle. The coating applied to the cylinder is dried, exposed to light under a diapositive and the unexposed portions of the coating are then removed by treatment with ethyl or methyl alcohol. To render the tanned image more clearly visible, a 0.5 percent alcoholic solution of methyl violet is poured over it and the excess dye solution is removed with water. The copper cylinder is then dried with warm air and the tanned coating is dipped for 2 minutes into a 2.5 percent solution of hydrochloric acid at a temperature of 20–26° C. The bared copper surface is then etched to the desired depth with an aqueous solution of ferric chloride which contains 410–415 grams of $FeCl_3$ per liter of solution (40° Bé.) and has a temperature of 20° C. A printing plate for intaglio printing is obtained which, after conventional chroming, is highly suitable for the printing of transparent films.

The partially N-methoxylated poly-ε-caprolactam may be replaced by the same amount of partially N-ethoxymethylated, N-propoxymethylated or N-propenoxymethylated poly-ε-caprolactam, with equally good results. Instead of 2.5 percent aqueous hydrochloric acid, 2 percent aqueous sulfuric acid or a 2 percent aqueous solution of aluminum chloride or ferric chloride may be used as the hardening solution.

*Example 2*

The procedure of Example 1 is repeated, but the coating solution consists of 200 ml. of a 3 percent solution, in 80 percent ethyl or methyl alcohol, of a partially N-methoxy methylated polycondensate of adipic acid and hexamethylene diamine having a K-value of 57.8 and a methoxy content of 8 percent. The result is a printing plate suitable for intaglio printing.

The aforementioned polycondensate may be replaced by the same amount of a partially N-ethoxymethylated, N-propoxymethylated or N-propenoxymethylated polycondensate of adipic acid and hexamethylene diamine with equally good results.

*Example 3*

The procedure of Example 1 is repeated but the support is a copper foil having a thickness of 30–70μ, which is backed with an electrically non-conductive sheet of hardened phenol-formaldehyde resin. After the light-sensitive material has been dried and exposed under a photographic negative and the unexposed portions of the coating have been removed with ethyl or methyl alcohol, the image is treated with a 0.5 percent alcoholic solution of methyl violet or fuchsine, the excess dye solution is removed with water, and the tanned coating is dried with warm air. The image is then treated with a 2.5 percent aqueous solution of hydrochloric acid and dried and the bared copper surface is etched with a ferric chloride solution of 40° Bé. A printed circuit is obtained.

As an alternative, the hardening solution may be a 2 percent aqueous solution of sulfuric acid or a 2 percent aqueous solution of aluminum chloride or ferric chloride.

As a further alternative, the support may be a sheet of polyvinyl chloride containing little or no plasticizer, or a transparent, electrically non-conductive film of polyterephthalic acid glycolester carrying a surface layer of copper. A suitable etching solution in the case of the polyterephthalic acid glycolester film backed with copper is one which contains, per liter of aqueous solution:

| | | |
|---|---|---|
| Calcium chloride | g.. | 271 |
| Ferric chloride | g.. | 262 |
| 80% nitric acid | ml.. | 7.2 |
| Concentrated hydrochloric acid | ml.. | 14.5 |
| and | | |
| Cupric chloride | g.. | 5.9 |

If the copper has been applied to the film by vapor deposition the etching solution may contain, per liter of aqueous solution,

| | | |
|---|---|---|
| Calcium chloride | g.. | 452 |
| Ferric chloride | g.. | 54 |
| 80% nitric acid | ml.. | 12 |
| and | | |
| Cupric chloride | g.. | 7.5 |

*Example 4*

The procedure of Example 3 is repeated but the coating solution is replaced by that of Example 2. A printed circuit is also obtained.

*Example 5*

200 ml. of a 3 percent solution, in 80 percent ethyl or methyl alcohol, of an N-methoxymethyl-poly-ε-caprolactam having a K-value of 63.2 and a methoxy content of 7.5–8 percent are well mixed, at 45–50° C., with mechanical stirring, with a solution of 3 grams of sodium 4,4′-diazidostilbene-2,2′-disulfonate in 50 ml. of 50 percent ethyleneglycol-monoethylether and made up to 300 ml. with 96 percent ethyl or methyl alcohol. The solution is filtered and then poured onto the chromium surface of a trimetal foil supported on a rotating disc, the trimetal foil consisting of layers of aluminum, copper and chromium. After drying, the coated metal foil is exposed under a diapositive and the unexposed portions of the coating are then removed by treatment with ethyl or methyl alcohol. In order to make the tanned image more easily visible, it is treated with a 0.5 percent alcoholic solution of fuchsine or methyl violet and the excess dye solution is washed away with water. The coating is dried and then treated with a 2.5 percent aqueous solution of hydrochloric acid. The bared areas of the chromium are then etched by treatment with an etching solution composed of 8 parts by volume of a saturated solution of calcium chloride, 2 parts by volume of glycerine and 1 part by volume of hydrochloric acid. This solution does not attack the copper layer under the chromium layer. A printing plate for planographic and offset printing is obtained, in which the printing areas consist of copper.

The hardening solution can, as an alternative, be a 2% aqueous solution of sulfuric acid, aluminum chloride or ferric chloride.

*Example 6*

The procedure of Example 5 is repeated, but the coating solution is replaced by the same amount of an alcoholic solution, of the same concentration, of an N-methoxymethylated polycondensate of adipic acid and hexamethylene diamine having a K-value of 57.8 and a methoxy content of 8 percent. A printing plate suitable for planographic and offset printing is obtained.

*Example 7*

The procedure of Example 5 is repeated, but the support is an aluminum-copper bimetal foil. After coating the copper surface on a rotating disc, drying with warm air and exposure under a photographic negative, the unexposed parts of the coating are removed by treatment with ethyl or methyl alcohol. To make the tanned image more clearly visible, a 0.5 percent alcoholic solution of fuchsine is poured over it, and the image is washed with water, dried and treated with a 2.5 percent aqueous solution of hydrochloric acid. The bared copper is then etched away with a ferric nitrate solution which contains 160 grams of $Fe(NO_3)_3 \cdot 9H_2O$ in 100 ml. of water. A printing plate for planographic and offset printing is obtained which yields long runs of prints.

The aluminum-copper bimetal foil can be replaced by a bimetal foil of steel and copper with equally good results. Alternative hardening solutions are 2 percent aqueous solutions of sulfuric acid, aluminum chloride and ferric chloride.

*Example 8*

The procedure of Example 7 is repeated but the coating solution of N-methoxymethyl-poly-ε-caprolactam is replaced by the solution of polycondensate specified in Example 6. A printing plate suitable for planographic and offset printing is obtained.

It will be obvious to those skilled in the art that many modifications may be made within the scope of the present invention without departing from the spirit thereof, and the invention includes all such modifications.

What is claimed is:

1. A process for developing light-sensitive material which comprises exposing a coated metallic base material to light under a master, the coating comprising a light-sensitive compound capable of rendering the coating insoluble in aqueous alcohol upon exposure to light and at least one compound selected from the group consisting of an N-alkoxymethylated poly-ε-caprolactam and an N-alkoxymethylation product of a partially depolymerized polycondensate consisting of the monomeric units of a ω,ω′-diamine condensed with a ω,ω′-dicarboxylic acid, removing the non-light struck portions of the coating by treatment with a solvent, hardening the remainder of the coating by treatment with a dilute aqueous solution of a compound selected from the group consisting of a non-oxidizing acid and a salt which liberates such acid by hydrolysis, and etching the metallic base material.

2. A process according to claim 1 in which the light-sensitive compound is an aryl azido compound.

3. A process according to claim 1 in which the light-sensitive compound has the formula

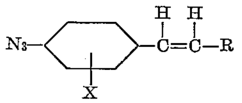

in which R is selected from the group consisting of aliphatic, aromatic, and heterocyclic groups, and X is selected from the group consisting of hydrogen, a water-soluble alkali salt-forming group, and $—SO_2—NH—R_1$, in which $R_1$ is an aryl group.

4. A process according to claim 1 in which the acid has a dissociation constant, measured at 25° C., of at least $1.1 \times 10^{-3}$.

5. A process according to claim 1 in which the acid is selected from the group consisting of hydrochloric and sulfuric acids.

6. A process according to claim 1 in which the salt is ferric chloride.

7. A process according to claim 1 in which the salt is aluminum chloride.

8. A process according to claim 1 in which the dilute aqueous solution used for hardening contains about 1 to 5 percent by weight of hardening agent.

9. A developed light-sensitive material comprising a metallic base material having image areas and etched non-image areas thereon, the image areas comprising at least one light and acid hardened, cross-linked compound selected from the group consisting of an N-alkoxymethylated poly-ε-caprolactam and an N-alkoxymethylation product of a partially depolymerized polycondensate consisting of the monomeric units of a ω,ω′-diamine condensed with a ω,ω′-dicarboxylic acid.

References Cited by the Examiner

UNITED STATES PATENTS

| | | | |
|---|---|---|---|
| 2,342,823 | 2/1944 | Schlack | 260—78 |
| 2,474,923 | 7/1949 | Watkins | 260—78 |

FOREIGN PATENTS

| | | |
|---|---|---|
| 790,131 | 2/1958 | Great Britain. |

NORMAN G. TORCHIN, *Primary Examiner.*

ALEXANDER D. RICCI, *Examiner.*

R. SMITH, *Assistant Examiner.*